(12) United States Patent
Sudman et al.

(10) Patent No.: US 11,410,257 B2
(45) Date of Patent: Aug. 9, 2022

(54) MESSAGE BOARDS

(71) Applicant: Rauland-Borg Corporation, Mount Prospect, IL (US)

(72) Inventors: David Sudman, Gurnee, IL (US); Alan Arsinow, Des Plaines, IL (US); Kevin Koga, Elgin, IL (US); Jon Scheer, Mount Prospect, IL (US); Brent Yard, Mount Prospect, IL (US)

(73) Assignee: Rauland-Borg Corporation, Mount Prospect, IL (US)

( * ) Notice: Subject to any disclaimer, the term of this patent is extended or adjusted under 35 U.S.C. 154(b) by 0 days.

(21) Appl. No.: 16/711,629

(22) Filed: Dec. 12, 2019

(65) Prior Publication Data
US 2020/0219217 A1    Jul. 9, 2020

Related U.S. Application Data

(63) Continuation-in-part of application No. 16/242,440, filed on Jan. 8, 2019, now abandoned.

(51) Int. Cl.
| | |
|---|---|
| G06Q 50/20 | (2012.01) |
| H04L 12/10 | (2006.01) |
| H04L 51/226 | (2022.01) |
| G09G 3/22 | (2006.01) |
| G06Q 10/10 | (2012.01) |
| H04L 51/18 | (2022.01) |

(52) U.S. Cl.
CPC ....... *G06Q 50/205* (2013.01); *G06Q 10/1093* (2013.01); *G09G 3/22* (2013.01); *H04L 12/10* (2013.01); *H04L 51/18* (2013.01); *H04L 51/26* (2013.01); *G09G 2380/06* (2013.01)

(58) Field of Classification Search
None
See application file for complete search history.

(56) References Cited

U.S. PATENT DOCUMENTS

| | | |
|---|---|---|
| 5,838,223 A | 11/1998 | Gallant et al. |
| 6,097,288 A | 8/2000 | Koeppe, Jr. |
| D527,011 S | 8/2006 | Bixler |
| 7,292,135 B2 | 11/2007 | Bixler et al. |

(Continued)

FOREIGN PATENT DOCUMENTS

WO    WO 2019/142370 A1    7/2019

OTHER PUBLICATIONS

Guo et al. "A ZigBee Network Application in Emergency Exit Guiding," *2010 International Computer Symposium* (ICS2010), 91-94 (2010).

(Continued)

*Primary Examiner* — Srinivas Sathiraju
(74) *Attorney, Agent, or Firm* — Leydig, Voit & Mayer, Ltd.

(57) ABSTRACT

A networked school communication system is provided that includes a district server configured to manage at least one communication system located within a district location managed by the district server. This communication system includes at least one message board including a housing with a front face, a message board interface for receiving message board commands, and a plurality of lighting elements located at the front face of the housing and configurable by the message board commands received over the message board interface.

13 Claims, 9 Drawing Sheets

(56) References Cited

U.S. PATENT DOCUMENTS

| | | | |
|---|---|---|---|
| 7,333,002 B2 | 2/2008 | Bixler et al. | |
| 7,526,529 B2 | 4/2009 | Unluturk et al. | |
| 8,032,403 B2 | 10/2011 | Gremont et al. | |
| 8,806,473 B2 | 8/2014 | Birtwhistle et al. | |
| 9,117,220 B2 * | 8/2015 | Whalin | G06Q 30/0252 |
| 9,299,238 B1 | 3/2016 | Ahmad et al. | |
| 9,461,953 B2 * | 10/2016 | Hideishi | H04L 51/26 |
| 9,552,571 B2 * | 1/2017 | Jain | G06Q 10/1095 |
| 9,854,010 B2 * | 12/2017 | Raghavan | H04L 67/26 |
| 10,236,387 B2 * | 3/2019 | Shionoiri | H03K 19/00346 |
| 10,489,423 B2 * | 11/2019 | Joiner | G06F 16/275 |
| 10,706,111 B1 * | 7/2020 | Nasserbakht | G06F 16/1873 |
| 10,708,202 B2 * | 7/2020 | Klassen | H04L 51/04 |
| 10,832,363 B2 * | 11/2020 | Mihai | G06Q 50/205 |
| 2002/0138328 A1 | 9/2002 | Arning et al. | |
| 2003/0074222 A1 | 4/2003 | Rosow et al. | |
| 2004/0145481 A1 | 7/2004 | Dilbeck et al. | |
| 2005/0075902 A1 | 4/2005 | Wager et al. | |
| 2006/0049936 A1 | 3/2006 | Collins et al. | |
| 2006/0111939 A1 | 5/2006 | Bixler et al. | |
| 2006/0112187 A1 | 5/2006 | Unluturk et al. | |
| 2006/0267740 A1 | 11/2006 | Bixler et al. | |
| 2007/0192174 A1 | 8/2007 | Bischoff | |
| 2007/0210910 A1 | 9/2007 | Norstrom et al. | |
| 2007/0288285 A1 | 12/2007 | Nilsson | |
| 2009/0212925 A1 | 8/2009 | Schuman, Sr. et al. | |
| 2009/0313659 A1 | 12/2009 | Samuels | |
| 2010/0169150 A1 | 7/2010 | Gremont et al. | |
| 2010/0191543 A1 | 7/2010 | Schuman | |
| 2010/0217618 A1 | 8/2010 | Piccirillo et al. | |
| 2010/0305973 A1 | 12/2010 | McLaren et al. | |
| 2011/0007883 A1 | 1/2011 | Bingham et al. | |
| 2011/0112877 A1 | 5/2011 | Govind et al. | |
| 2011/0208541 A1 | 8/2011 | Wilson et al. | |
| 2011/0246220 A1 | 10/2011 | Albert | |
| 2012/0028589 A1 | 2/2012 | Fan et al. | |
| 2012/0329420 A1 | 12/2012 | Zotti et al. | |
| 2013/0264074 A1 | 10/2013 | Lewis et al. | |
| 2013/0323699 A1 | 12/2013 | Edwards et al. | |
| 2014/0024333 A1 | 1/2014 | Stadtlander | |
| 2014/0101068 A1 * | 4/2014 | Gidugu | G06Q 10/00 705/327 |
| 2014/0132393 A1 | 5/2014 | Evans | |
| 2014/0244819 A1 | 8/2014 | Patrick et al. | |
| 2014/0327519 A1 | 11/2014 | Carroll et al. | |
| 2014/0379357 A1 | 12/2014 | Srivathsa et al. | |
| 2015/0109442 A1 | 4/2015 | Derenne et al. | |
| 2015/0130350 A1 * | 5/2015 | Braunstein | H05B 47/11 315/86 |
| 2015/0179716 A1 * | 6/2015 | Kuroda | F21S 8/04 315/86 |
| 2015/0317757 A1 * | 11/2015 | Mihai | G06Q 50/20 705/326 |
| 2015/0339407 A1 | 11/2015 | Gallo et al. | |
| 2016/0021039 A1 * | 1/2016 | Woo | H04L 12/1827 715/752 |
| 2016/0148330 A1 * | 5/2016 | Roman | G06Q 50/205 705/326 |
| 2016/0165369 A1 * | 6/2016 | Perkins | G06Q 30/0281 715/716 |
| 2017/0039823 A1 | 2/2017 | Srivathsa et al. | |
| 2017/0126818 A1 * | 5/2017 | Kang | H04W 4/029 |
| 2017/0146203 A1 * | 5/2017 | Belaidi | H05B 45/60 |
| 2017/0257400 A1 | 9/2017 | Peters | |
| 2018/0162413 A1 | 6/2018 | Theodosiou | |
| 2018/0330813 A1 * | 11/2018 | Garber | G08B 25/10 |
| 2019/0088097 A1 | 3/2019 | Jacobs | |
| 2019/0228373 A1 * | 7/2019 | Godwin | G06Q 30/02 |
| 2019/0295207 A1 | 9/2019 | Day et al. | |
| 2019/0347749 A1 * | 11/2019 | Mihai | G09B 5/00 |
| 2020/0153391 A1 * | 5/2020 | Grede | H01J 37/32174 |
| 2020/0219217 A1 * | 7/2020 | Sudman | H04L 12/10 |
| 2020/0221549 A1 * | 7/2020 | Sudman | H05B 47/155 |

OTHER PUBLICATIONS

European Patent Office, International Search Report and the Written Opinion in International Application No. PCT/US2020/053706 (dated Jan. 18, 2021).

* cited by examiner

MESSAGE BOARDS

CROSS-REFERENCE TO RELATED APPLICATIONS

This application is a continuation in part of U.S. patent application Ser. No. 16/242,440, filed on Jan. 8, 2019, which is hereby incorporated by reference in its entirety.

FIELD OF THE DISCLOSURE

Embodiments of this disclosure generally relate to communication systems, and, in certain embodiments, to a communication system integration and operation.

BACKGROUND OF THE INVENTION

Communication systems facilitate communication of status and events within some defined area. For instance, one particular type of communication system is an intercom system within a school campus. The school intercom system communicates status and events within a school campus. In this manner, students and staff within the school will be able to maintain a daily schedule for the school and be able to receive specific information via the announcements. Typically, the intercom system allows for audio communication, which can be less efficient when attempting to ascertain a status of an individual or group of classrooms.

BRIEF SUMMARY OF THE INVENTION

A particular embodiment provides a message board integrated within a school communication system, the message board comprising: a housing comprising a front face; a message board interface communicatively coupled to the school communication system; and a plurality of lighting elements located at the front face of the housing and configurable by message board commands received over the message board interface.

Another embodiment provides a networked school communication system, comprising: a district server configured to manage at least one communication system located within a district location managed by the district server; a district network configured to communicatively couple the at least one communication system and the district server; and a user interface configured to allow access to the district server to control the at least one communication system, wherein the at least one communication system comprises: a network switch configured to integrate communication equipment associated with the district location into the at least one communication system; a campus controller communicatively coupled to the network switch and configured to control the communication equipment associated with the district location; a message board configured to display a message; and a classroom controller communicatively coupled to the campus controller and configured to control classroom communication equipment including a status indicator light and a speaker, wherein the message board comprises: a housing comprising a front face; a message board interface communicatively coupled to the network switch; and a plurality of lighting elements located at the front face of the housing and configurable by message board commands received over the message board interface.

Yet another embodiment provides a school communication system for at least one school campus with a plurality of classrooms, the system comprising: a campus controller configured for controlling communication equipment associated with the at least one school campus; a network switch configured to integrate the communication equipment associated with the at least one school campus; a plurality of classroom controllers associated with the plurality of classrooms, each classroom controller of the plurality of classroom controllers is communicatively coupled to the campus controller and configured to control classroom communication equipment for its associated classroom, the classroom communication equipment for each classroom of the plurality of classrooms includes a status indicator light and a speaker; and a plurality of message boards for displaying one or more messages, wherein each of the plurality of message boards comprises: a housing comprising a front face; a message board interface communicatively coupled to the network switch; a plurality of lighting elements located at the front face of the housing and configurable by message board commands received over the message board interface; and an auxiliary output port configured to connect to a status indicator light of the school communication system.

BRIEF DESCRIPTION OF THE SEVERAL VIEWS OF THE DRAWING(S)

The accompanying drawings incorporated in and forming a part of the specification illustrate several aspects of the present invention and, together with the description, serve to explain the principles of the invention. In the drawings.

Figure 1:
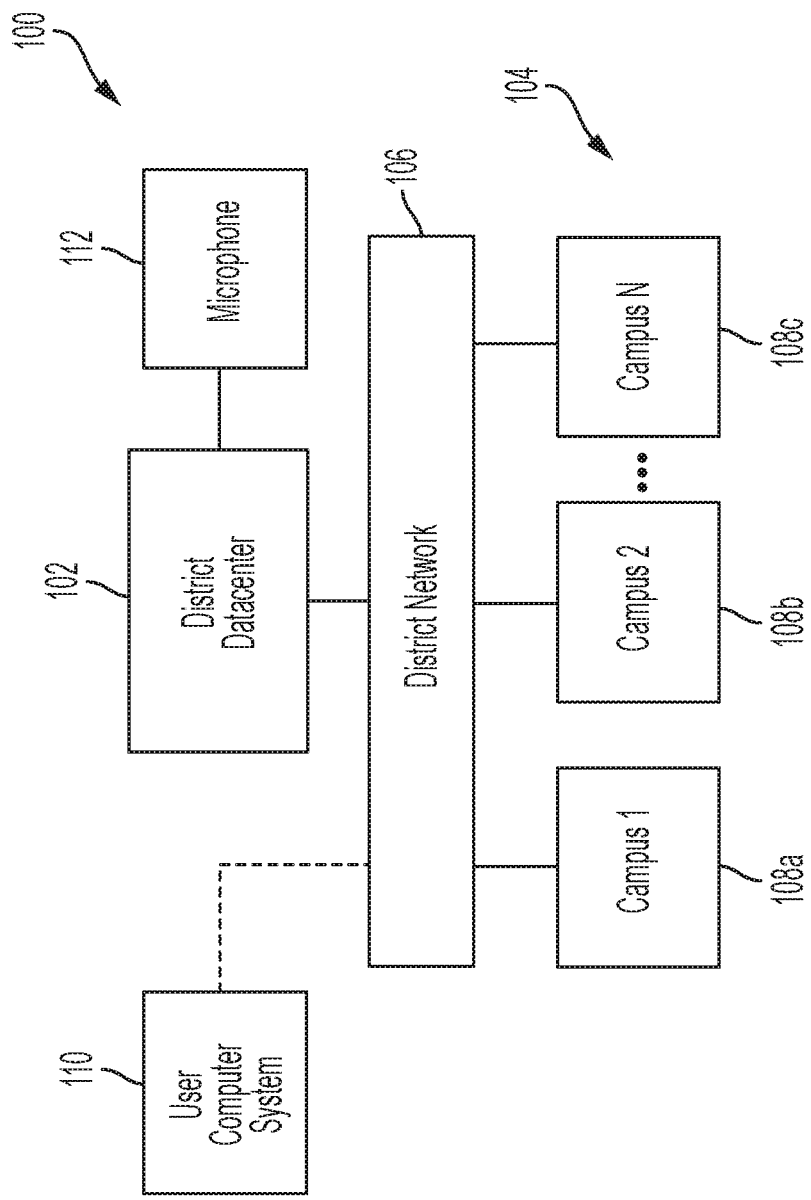
FIG. 1 is a block diagram of a communication system integrated at a school district level, according to an exemplary embodiment.

While the disclosure will be described in connection with certain preferred embodiments, there is no intent to limit it to those embodiments. On the contrary, the intent is to cover all alternatives, modifications and equivalents as included within the spirit and scope of the disclosure as defined by the appended claims.

DETAILED DESCRIPTION OF THE INVENTION

Embodiments of the disclosure described below are directed to communication systems that facilitate quick and efficient communication of status, events and information to relevant personnel with respect to activities happening within a particular structure or structures that contain the communication system. For instance, embodiments of the disclosure describe communication systems with critical functionality such as providing emergency alerts and status to first responders and other such individuals during an emergency situation.

The embodiments of the communication system described below are directed to improvements on a traditional intercom system typically found within a school environment. However, the communication system that is the subject of the disclosure contained herein is not intended to be limited to use within a school environment. Indeed, embodiments of the communication system, including the status indicator lights, may be utilized in any environment that includes rooms, spaces and/or hallways, such as found in office buildings or other similar structures. As such, the disclosure describing the functionality of the communication system and status indicator lights described below are not limited strictly to the school environment. Rather, the description is provided in relation to the school environment for ease of description, and could be extrapolated to other environments, as would be understood by one of skill in the art in view of the disclosure contained herein.

For instance, embodiments of the communication system described below within a school include use of one or more status indicator lights. These status indicator lights are generally associated with individual rooms, areas, hallways and zones within the school to provide visual communication to certain personnel. In addition these status indicator lights can be operated in a variety of ways to display a variety of colors and flash patterns, either synchronous to audio messages or in a standalone fashion, in order to communicate different statuses to an observer. The described functions and operation of the status indicator lights below can be adapted to other environments outside of the school environment. Indeed, similar operation of the status indicator lights could provide visual communication within environments such as an office building or park, or any structure or collection of structures with rooms, hallways and/or other spaces.

With respect to the school environment, individual schools may be arranged into school districts based on a geographic proximity between each school. Further, each school may include communication equipment that allows for communication of a school schedule and for communication between locations within the school and the district. This communication equipment generally includes devices such as bells and classroom speakers for direct communication between a classroom and a front office of the school. Typically, the communication equipment within each individual school is not interconnected district wide.

FIG. 1 illustrates a district wide interconnected and centrally administered school district communication system 100. As illustrated in FIG. 1, a plurality of school campuses 104, each with an individual school communication system, are organized into the school district communication system 100. As illustrated, the plurality of school campuses 104 are interconnected through a district network 106, which in turn interfaces the plurality of school campuses 104 with a district datacenter 102. The district datacenter 102 includes a server or servers each with an associated processor or processors running a networked application controlling a communication system within each of the plurality of school campuses 104. The networked application provides school district administrators with the ability to control all communication among the plurality of school campuses 104. This control is provided through a user interface, which allows control over bell schedules, announcements and other calendar management tools along with enabling emergency notifications for lockdown, lock out and evacuation events. School administers access this user interface via a user computer system 110, which is communicatively coupled to the district network 106.

In a particular embodiment, the user interface may be a web-based user interface, and the user computer system 110 can be any computer system that is capable of communicating with the district network 106 over the web-based user interface. For instance, the computer system 110 may take a variety forms such as a mobile device, tablet device, laptop computer or any device capable of communicating with the web-based user interface.

Further, access to the web-based user interface from the user computer system 110 is granted based on an administrator's or user's login credentials. Any time a user accesses the web-based user interface, login credentials will be required before any functionality is provided. The login credentials not only provide access to the web-based user interface, but they also provide a level of access to the communication systems at the plurality of school campuses 104. For instance, in certain embodiments, the plurality of school campuses 104 may include individual school campuses 1-N, 108a, 108b and 108c, and the individual user may only be authorized to control the communication system at a single campus such as school campus 1 108a. Therefore, upon entering the user login credentials, the district datacenter 102 administrating the web-based user interface will look up the user's level of access and provide control only according to that access via the web-based user interface.

In certain embodiments, the district datacenter 102 further includes an integrated computer terminal that hosts a microphone 112. The microphone 112 is configured to allow a user to provide audio to the microphone 112, which can be streamed to any communication system at any campus 108a, 108b or 108c within the district. As an aside, each individual school communication system (see FIG. 2) can also include an integrated computer terminal that hosts a microphone client into which a microphone can be integrated such that an audio signal from the microphone can be broadcast over the individual school communication system.

Figure 2:
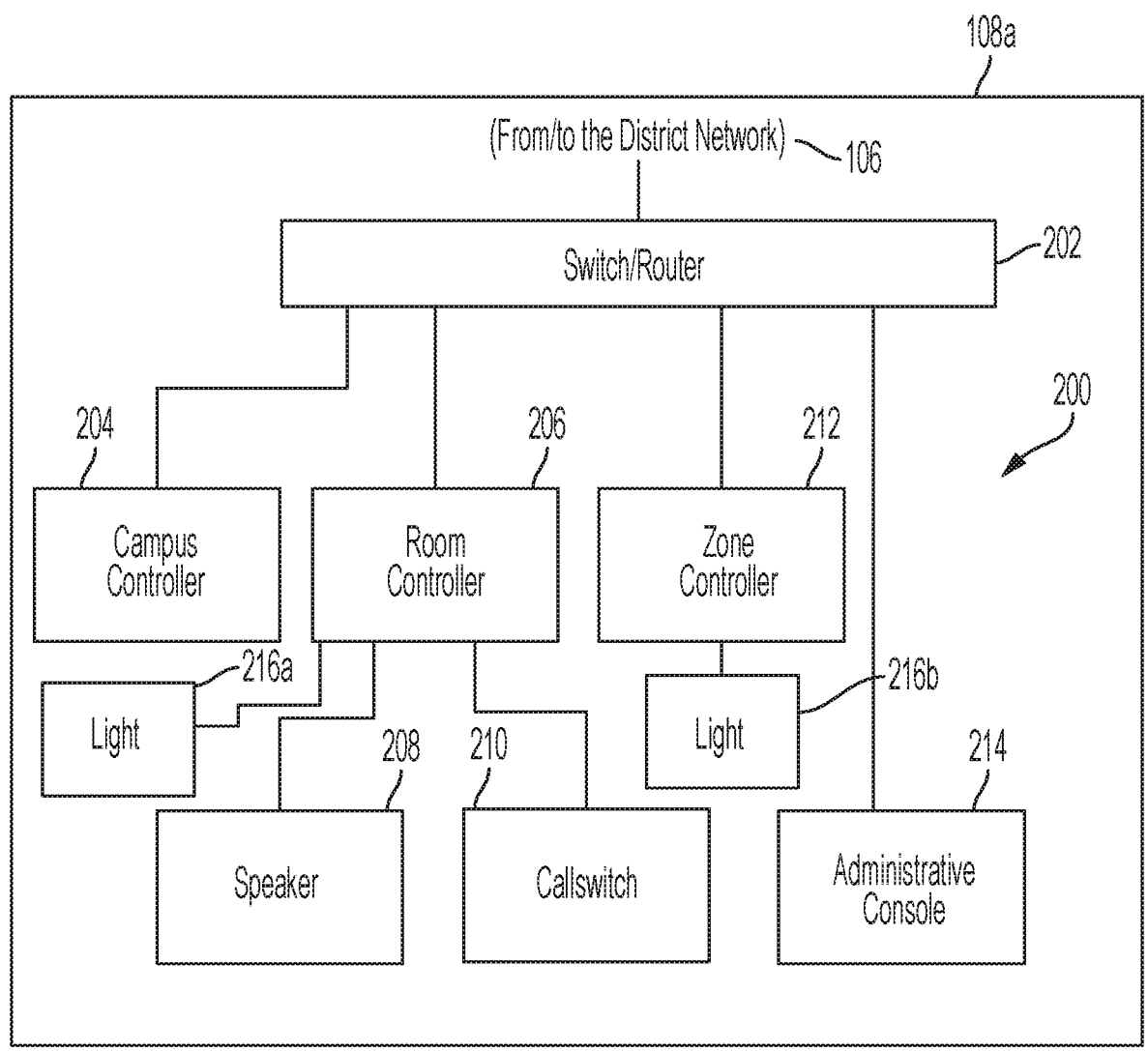
FIG. 2 is a block diagram of components of the communication system of FIG. 1, at the individual school level, according to an exemplary embodiment.

FIG. 2 illustrates the components of the school communication system 200 for individual school campus 108a (individual school campuses 108b and 108c may include school communication systems similar to school communication system 200). The school communication system 200 includes a switch/router 202, which provides a shared network connection for the various components of the school communication system 200 to the district network 106 (see FIG. 1). The various components of the school communication system 200 are distributed throughout a plurality of zones, which define physical spaces within the school campus 108a. In this regard, each zone has zone specific communication equipment associated with the district location/school campus 108a.

Components of the school communication system 200 include a campus controller 204, a room or classroom controller 206, a zone controller 212, an administrative console 214 and status indicator lights 216a and 216b. The campus controller 204 is an embedded interface for all of the campus devices located at the campus 108a to the district datacenter 102 (see FIG. 1). In this regard, the campus controller 204 functions to provide the interface for the classroom controller 206, the zone controller 212 and the administrative console 214 to the district datacenter 102. The campus controller 204 functions as a Session Initiation Protocol (SIP) Gateway, including processors and memory devices that enable the campus controller 204 to provide communication to/with various communication equipment, or, in other words, the campus communication equipment, including the classroom controller 206, the zone controller 212 and the administrative console 214. In this regard, the campus controller 204 functions to provide full paging, pre-recorded audio, live audio, intercom audio, and other control signals to any single campus device or combination of campus devices located within any number of zones throughout the campus 108a. Typically, the campus controller 204 interprets instructions received from the district datacenter 102 (see FIG. 1) by parsing those instructions to determine embedded communication events. The campus controller then optionally stores/archives those instructions with an associated memory (not illustrated) and transmits the instructions in the form of a control signal to various campus devices.

The school communication system 200 further includes the classroom controller 206 associated with each classroom of the school at campus 108a. In certain embodiments, each classroom can be considered a separate zone within the campus 108a. The classroom controller 206 communicates via IP-based signals and interfaces with the campus controller 204 through the switch/router 202 such that it sends/receives data to/from the campus controller 204. In this manner, the classroom controller 206 functions as an IP room module. The classroom controller 206 interfaces with a speaker 208, an in-room strobe or alert light (not illustrated), one or more switches or buttons such as a check-in or call switch 210, and a status indicator light 216a over a digital interface.

In certain embodiments, the speaker 208 interfaces with the classroom controller 206 through a bi-directional amplifier (not illustrated) which allows for the speaker module 208 to function as both a speaker and a microphone for the classroom controller 206. Typically, communication will be between the classroom controller 206 and the administrative console 214 or an external phone system and is controlled by the campus controller 204. The call switch 210 allows for personnel within the classroom containing the classroom controller 206 to call into the administrative console 214 or perform a check-in during an emergency situation. The classroom controller 206 can also trigger a visual indicator such as an in room strobe light or alert light upon receiving a command to do so from the campus controller 204. The classroom controller 206 can further trigger a visual indicator external to the classroom from the status indicator light 216a upon receiving a command to do so from the campus controller 204.

School communication system 200 further includes the zone controller 212, which functions in a similar manner to the classroom controller 206. Typically, a school will include a plurality of zones, other than classrooms, which comprise various locations throughout the school and campus in general. Typically, each non-classroom zone within the school will include at least one zone controller 212. The zone controller 212 decodes IP-based signals from the campus controller 204 into signals for controlling a status light indicator 216b. The zone controller 212 communicates these control signals to the status indicator light 216b over a digital interface. The school communication system 200 further includes the administrative console 214, which, in certain embodiments, provides a single point of access to the school communication system 200. In this regard, the administrative console 214 is equipped with various interfaces, speakers and microphones for communication within the school communication system 200. The administrative console 214 can initiate classroom intercom discussion over the classroom controller 206, perform zone or system-wide pages and receive visual alerts from classroom communications over a display associated with the administrative console 214. In certain embodiments, the administrative console 214 can also perform preprogrammed sequences for the school communication system 200, such as initiating an emergency sequence.

As mentioned above, the administrative console 214 includes an associated display. In certain embodiments, during an emergency event, the display can be configured to function as a centralized emergency console or in other words an emergency display console that can display check-in information for each zone or classroom within the school campus 108a (see FIG. 1). Check-in information indicates that a classroom has checked in by pressing the call switch 210 during the emergency event and thereby indicates that the particular classroom associated with that call switch 210 is not in an immediate emergency. In this regard, first responders to an emergency situation will have a single point where immediate status of the various classrooms and zones within the school campus 108a. As an aside, the administrative console 214 is not required to also be the centralized emergency console as well. A separate device similar to the administrative console 214 could be utilized as a dedicated device to function as an emergency console only during emergency events.

Figure 3:
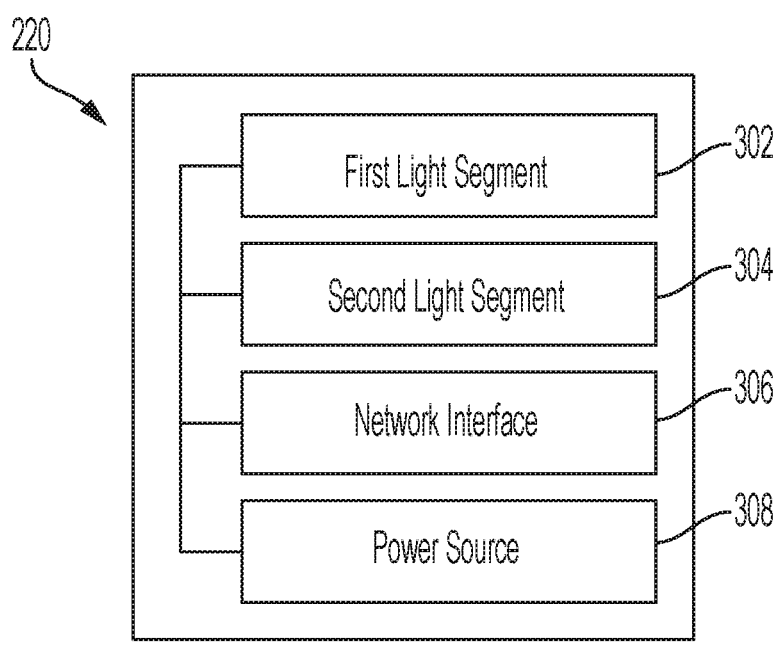
FIG. 3 is a block diagram of a status indicator light, according to an exemplary embodiment.

FIG. 3 illustrates a block diagram of status indicator lights 216a and 216b, collectively shown as status indicator light 216. In certain embodiments, a single status indicator light 216 is associated with each classroom and with each zone within a school campus. Typically, each of the status indicator lights 216 are arranged external to the classroom yet proximate to the entrance to the classroom. With respect to status indicator lights 216 within a defined zone of the campus, each status indicator light 216 is located in a central clearly visible area of the zone. In this manner, an individual tasked with monitoring the school can quickly receive a visual representation of a classroom or zone status. For instance, in a school with long hallways and classrooms branching off from the hallways, the lights would be arranged in front of the entrances to the classrooms down the hallway so that a plurality of status indicator lights can be viewed simultaneously. Additionally, in a particular embodiment, the hallway connecting each of the classrooms may represent a zone within the school, and the zone status indicator light 216 may show an overall status based on the collection of classrooms connected to the hallway. In this manner, an administrator may visually check the status of the zone status indicator light 216 first to check the group of classrooms quickly, and if an issue is present, then the administrator can further visually check the individual status indicator lights 216 for finer detail.

In the illustrated embodiment of FIG. 3, the status indicator light 216 includes a first light segment 302 and a second light segment 304. In other embodiments, more or less light segments are contemplated, such as up to 10 or more light segments. Each light segment 302 and 304 are independently configurable via the web-based user interface accessed from the user computer system 110 (see FIG. 1). Accordingly, commands provided from the district datacenter 102 are provided to the campus controller 204 (see FIG. 2) of the school communication system 200 to control the status indicator light 216. In this manner, the campus controller 204 sends IP command signals to the classroom controller 206 that are parsed for transmission to the status indicator light 216 over a digital interface 306. These commands provide timing of lighting changes for each of the first light segment 302 and the second light segment 304. These commands also provide a type of lighting change such as changing either or both the light segments 302 and 304 from an "off" state to an "on" state. More specifically, because each of light segment 302 and 304 are capable of displaying in a plurality of colors (ten colors in certain embodiments) and capable of maintaining constant illumination or various blink patterns, a variety of lighting commands are available. In certain embodiments, up to 1,024 different lighting commands are available for each status indicator light 216 within the school communication system 200.

In certain embodiments, the first light segment 302 includes a first Light Emitting Diode (LED) segment, and the second light segment 304 includes a second LED segment. In other embodiments, the first light segment 302 and the second light segment 304 include light sources other than an LED, such as a Compact Fluorescent Light (CFL), or any other light source configurable in the manner described herein.

The digital interface 306, in certain embodiments, may be a RJ45 connector interface for use in data links. Digital interface 306 may comprise network interface cards, such as Ethernet cards, optical transceivers, radio frequency transceivers, or any other type of device that can send and receive information. Non-limiting examples of digital interfaces 306 include RS-485, RS-422, RS-232, Universal Asynchronous Receiver-Transmitter (UART), Ethernet, radios compatible with several Wi-Fi standards, 3G, 4G, Long-Term Evolution (LTE), Bluetooth®, etc.

The illustrated embodiment of the status indicator light 216 of FIG. 3 further includes a power source 308. Power source 308 provides power to the status indicator light 216. For example, the status indicator light 216 may be battery powered through rechargeable or non-rechargeable batteries utilizing nickel-cadmium or other suitable material. Power source 308 may include a regulator for regulating power from the power grid in the case of a device plugged into a wall outlet, and in some devices, power source 308 may utilize energy scavenging of ubiquitous radio frequency (RF) signals to provide power to the status indicator light 216. Additionally, in certain embodiments, power source 308 may include power over Ethernet via standards 802.3af or 802.3at or any other suitable standard.

Figure 4:
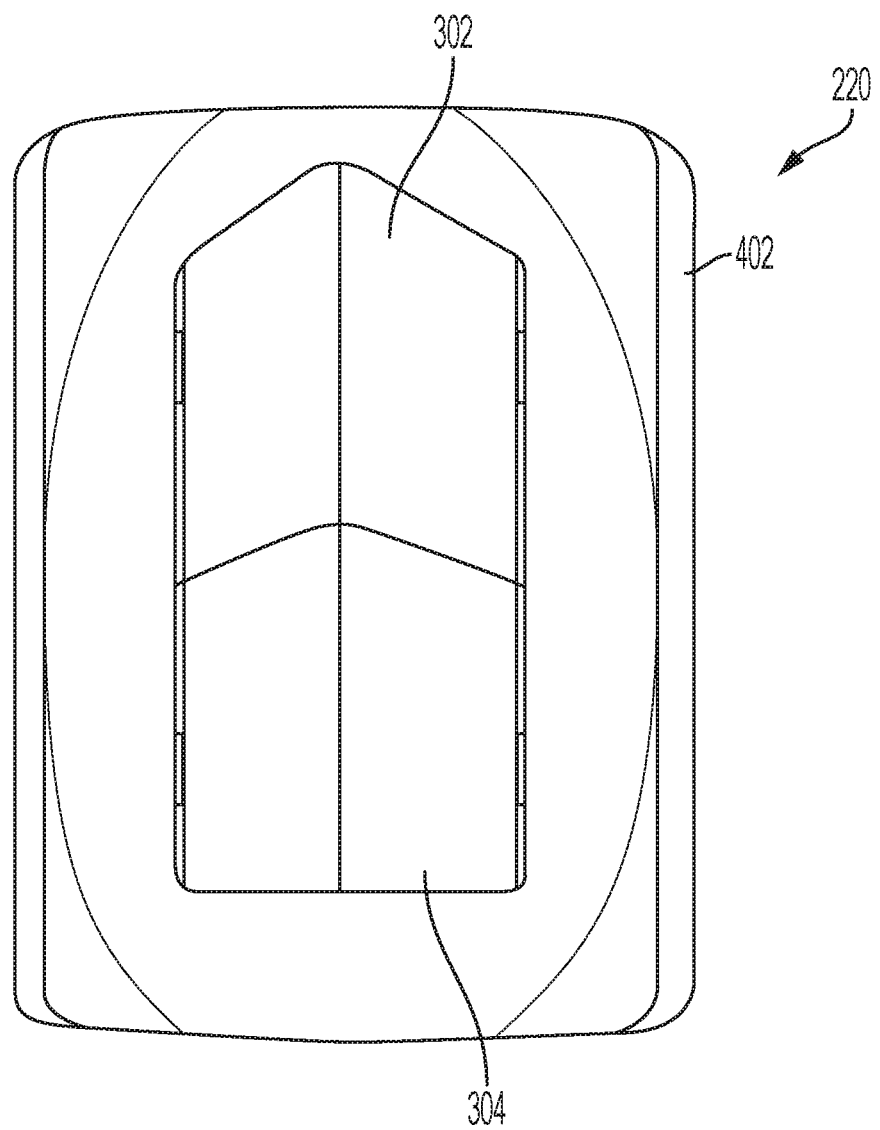
FIG. 4 is a plan view of a status indicator light, according to an exemplary embodiment.

FIG. 4 illustrates a plan view of the status indicator light 216. As illustrated, the first light segment 302 and the second light segment 304 are approximately the same size. Also, the status indicator light 216 includes the first light segment 302 immediately above the second light segment 304. In other embodiments, the first light segment 302 and the second light segment 302 may be disposed next to each other in a horizontal direction rather than in a vertical direction, as shown in FIG. 4. Additionally, light segment 302 and light segment 304 may be separated such that the two segments are not next to each other.

As an aside, while the illustrated embodiment shown in FIGS. 3 and 4 provide two light segments 302, 304, more or fewer light segments are contemplated. Accordingly, the status indicator light 216 may have as few as one light segment or as many as ten or more light segments.

The status indicator light 216 further includes a housing 402. The housing 402 functions to fasten the first light segment 302 and the second light segment 304 in place. Accordingly, the housing 402 includes an attachment mechanism for fixing the status indicator light 216 in place. For instance, if the status indicator light 216 is configured to be outside of an entrance of a classroom off a hallway of a school, then the attachment mechanism of the housing 402 is configured to attach the status indicator light 216 to some structure proximate the entrance to the classroom, such as a ceiling or wall. A non-limiting example of the attachment mechanism is a screw and bracket system to which the housing 406 is fixed once the status indicator light 216 is installed within the school.

The status indicator light 216 of FIGS. 2, 3 and 4 is utilized to provide notice of classroom and zone status to individuals within a school. Accordingly, lighting commands are sent to the status indicator light 216 during certain events occurring within the school. A first example providing a use case for the status indicator light 216 is providing a classroom call-in status. Classroom call-in status, at a basic level, provides an easy visual indicator for classroom status. In a particular embodiment, in an emergency situation, the first light segment 302 (see FIG. 4) is illuminated red to show an emergency situation and the second light segment 304 is illuminated either red or green to indicate that the room is either not checked in (red) or checked in (green). Because each classroom contains its own status indicator light 216 on the exterior of the classroom, a visual indicator of classroom status is easily provided to emergency personnel or a school administrator.

Additionally, in other embodiments, a single status indicator light 216 could be configured within a zone associated with a plurality of classrooms. In this manner, this single status indicator light 216 of the zone is able to represent the plurality of classrooms within the zone in such a manner that a status for a group of classrooms can be ascertained by viewing this one status indicator light 216.

Moreover, a classroom check-in status can be displayed on a user interface at the administrative console 214 (see FIG. 2). The check-in status will be displayed for each classroom based on the state of the status indicator light 216 associated with that classroom. This provides another quick method for emergency personnel or the school administrator to determine classroom status.

With respect to the emergency situation discussed above, Table 1 below illustrates a particular embodiment showing a relation between events that may take place during a lockdown sequence and their associated lighting and audio actions. In certain embodiments, the following lockdown sequence may be initiated or terminated from a designated pushbutton, computer, administrative console or SIP telephone.

TABLE 1

| Event | Action |
| --- | --- |
| Beginning of Lockdown | Play a prerecorded audible message to selected speakers in the facility stating that a Lockdown is in progress and to take appropriate actions.<br>Begin displaying a customizable light pattern on the top light segment of all SLs in the facility to indicate that Lockdown is in progress<br>E.g.<br>  Red ON, 1.5 second<br>  Off ⅛ second<br>  Orange ON, ⅛ second<br>  Off ⅛ seconds<br>  Orange ON, ⅛ second<br>Repeat indefinitely.<br>Send an email message to selected users indicating that a lockdown has been initiated. |

TABLE 1-continued

| Event | Action |
|---|---|
| End of Lockdown | Play a prerecorded audible message to selected speakers in the facility stating that the Lockdown has ended, and to resume normal activities.<br>Turn off the top light segment on all Status Lights in the facility.<br>Send an email message to selected users indicating that the Lockdown has ended. |

Table 1 breaks the lockdown sequence into two primary events, a beginning of the lockdown and an end of the lockdown. In the embodiment provided in Table 1, at the beginning of the lockdown, a prerecorded audible message is played at selected speakers within the campus. This audible message may inform people within the campus that a lockdown is in progress and to take some appropriate action, such as sheltering in place, etc. At the same time, a customizable lighting pattern may be initiated at one or more of status indicator lights 216 (see FIGS. 2, 3, and 4). In a particular embodiment, the customizable lighting pattern may include activating the top light segment 302 (see FIG. 4) of all of the status indicator lights 216 at the campus is the following manner: turn red for 1.5 seconds, turn off for one-eighth second, turn orange for one-eighth second, turn off for one-eighth second, and turn orange for one-eighth second. This lighting sequence would be repeated indefinitely during the lockdown. Additionally, the bottom light segment 304 may be utilized for other indications, such as call-ins or check-in status for individual classrooms, as discussed above.

In the particular embodiment shown in Table 1, at the end of the lockdown, another prerecorded audible message is played to selected speakers within the campus. The message states that the lockdown has ended and to resume normal activities. At the same time, the lighting pattern activate during the lockdown at the status indicator lights 216 is stopped. Additionally, the school communication system 200 (see FIG. 2) may have an email message sent to selected users indicating that the lockdown has ended.

Another exemplary use for the status indicator light 216 (see FIGS. 2, 3 and 4) is to provide a visual indication of class change status. Table 2 below illustrates a relation between events that take place during a class change sequence and their associated lighting and audio actions.

TABLE 2

| Event | Action |
|---|---|
| End of class period | Play a unique customizable 3 second sound file to selected speakers in the facility.<br>Begin displaying a light pattern on the bottom light segment of all SLs in the facility.<br>E.g.<br>  Green ON, ½ second,<br>  Off ½ second,<br>  Repeat indefinitely. |
| 30 seconds before the beginning of the next class period. | Begin displaying a different light pattern on the bottom light segment of all SLs in the facility.<br>E.g.<br>  Orange ON, ¼ second,<br>  Off ¼ second,<br>  Repeat indefinitely |
| Beginning of next class period | Play a unique customizable 3 second sound file to selected speakers in the facility<br>Turn off the bottom light segment on all Status Lights in the facility. |

In this example, the status indicator light 216 will illuminate along with the typical period change audio tone that is provided to indicate class changes in typical school communication systems. For instance, a status light would display at an end of a class period or, in other words, the start of the class change period, with a particular pattern, and that pattern would shift to a different pattern some time, for example 30 seconds, before the completion of the class change period.

In the specific embodiment shown in Table 2, at the end of the class period, a customizable class end audio event (bell) is activated, and the status indicator light 216 for each classroom activates. For instance, the status indicator light 216 may repeatedly display a solid green light on the bottom segment for one half of a second and then turn off for one half a second. Thirty seconds prior to the end of the class change period, another short audio event (a three second, pulsing bell, for example) may occur and the status indicator light 216 for each classroom will start a different lighting pattern, such as repeatedly flashing an orange light "on" for one-quarter second and "off" for one-quarter second. This provides a visual and audio cue to students that they must be seated in their classroom in short order. At the end of the class change period, or in other words, the beginning of the next class period, another customizable audio event (bell) provides the final indication that class has begun and the status indicator light 216 turns off both light segments 302 and 304 (see FIGS. 3 and 4).

Yet another exemplary use for the status indicator light 216 (see FIGS. 2, 3, and 4) is to display a particular classroom attribute showing a test period status for individual classrooms within a school. In this example, a particular status indicator light 216 can be manually changed to indicate status for whether its associated classroom is conducting a test, such as a college admission test (ACT, SAT, etc.). Individual status indicator lights 216 can be manipulated using the web-based user interface via the user computer system 110 (see FIG. 1). Using the web-based user interface, a user can configure a soft key displayed at the administrative console 214 for each classroom with a status indicator light 216. Using this soft key, an administrator can quickly initiate a lighting event at the status indicator light 216 showing that a particular classroom is conducting a testing event. In a particular embodiment, the second light segment 304 (see FIG. 4) of status indicator light 216 turns yellow for all classrooms in an active test period. This action can be activated from a controls screen at the administrative console 214. The status indicator light 216 can also be turned off from a console. If multiple classrooms are conducting timed testing, a group of status indicator lights 216 can be added to a schedule for additional convenience in actuating the individual lighting segments "on" or "off." In this manner, the status indicator lights 216 may provide immediate visual indication that a particular classroom is currently in a test period and should not be disturbed.

As an aside, the above example use cases for the status indicator light 216 (see FIGS. 2, 3 and 4) are not the only use cases. Indeed, additional use cases for utilizing the status indicator light 216 for indicating classroom status are contemplated, such as indicating a type of class session, a specific class period during a typical school day, and an age group of students in a classroom, etc.

Additionally, these further use cases may include various other situations where the status indicator lights 216 are used in conjunction with a room speaker, such as providing a unique lighting sequence at the status indicator light 216 during various types of audio announcements. These unique lighting sequences may include any sort of combination of flash pattern incorporating timing and color changes in the various lighting segments of the status indicator lights 216. For instance, in a particular embodiment, an all page announcement may have one or more light segments 302 or 304 of the status indicator light 216 repeatedly flash purple for one-quarter of a second. Another example would be an emergency all page, where one or more light segments 302 or 304 of the status indicator light 216 repeatedly turn red for one-quarter second, turn off for one-quarter second, turn blue for one-quarter second, and turn off for one-quarter second. Yet another example is a prerecorded page announcement, where one or more light segments 302 or 304 of the status indicator light 216 turn a solid yellow during the announcement. Similar to the previous example, the light segments 302 or 304 may turn a solid green during an intercom announcement. A final exemplary audio and lighting action is a sequence audio announcement, where one or more light segments 302 or 304 of the status indicator light 216 repeatedly turn orange for one-half second and turn off for one-half second.

Figure 5:
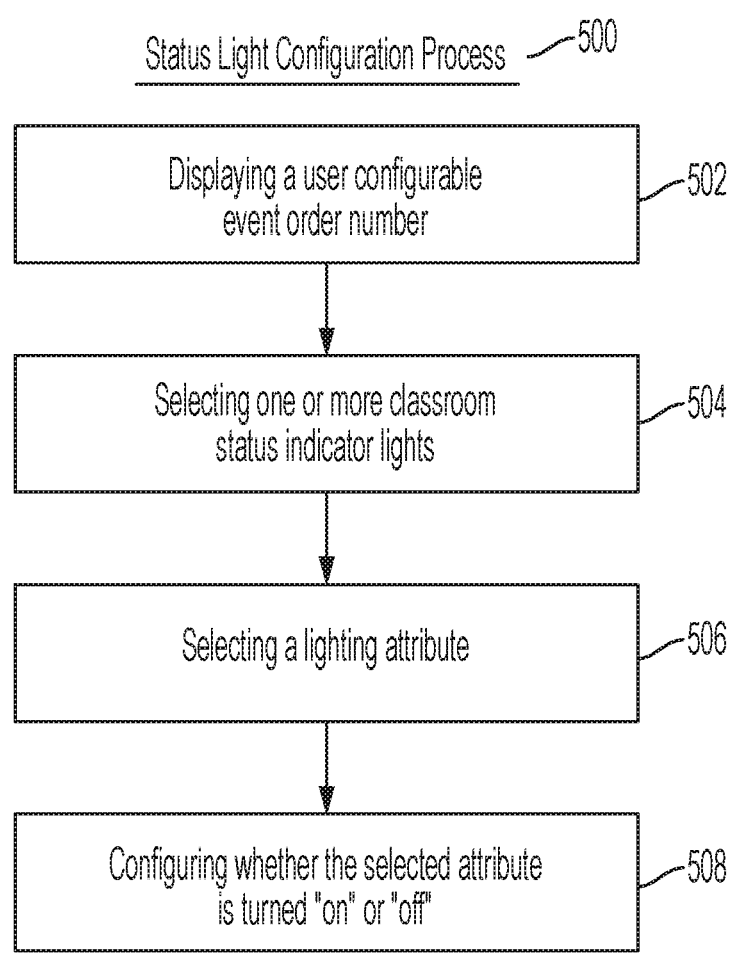
FIG. 5 is a process flow chart for configuring a status indicator light, according to an exemplary embodiment.

In general, functionality of the status indicator light 216 (see FIGS. 2, 3 and 4) is set up via the web based user interface from the user computer system 110 (see FIG. 1). FIG. 5 illustrates a status light configuration process 500. The process 500 provides exemplary steps performed by the user interface while setting up a sequence of events to be performed by the school communication system 200 (see FIG. 2) when at least one action within the sequence is performed by a status indicator light 216. For instance, in the above second example of a status light state during a class change period, the light changes twice from when it first turns on with a particular pattern and then shifts to a second pattern before the end of the class change when the status light turns off. This process occurs over a precise timeframe and in conjunction with audible tones. As such, this would define a school communication sequence of events that includes an order of operation of the events and timing between each event. FIG. 5 illustrates the process for changing one such lighting event within the larger sequence, such as turning on the first light pattern during the onset of the class change period.

At step 502, the user interface allows the creation of an ordered sequence of events. For instance, in the above class change example, the first event within a class change sequence would be the audible tone indicating the end of a class period, and the second event would be to initiate a first lighting pattern at one or more status indicator lights 216 (see FIG. 2). Accordingly, in this example, the user would select this lighting event as the second event within the class change sequence.

At step 504, a user selects, via the web-based user interface, one or more status indicator lights 216 (see FIG. 2). In the class change example, this may be every light 216 within the school; however, in another case, such as the in-room testing example three above, only a subset of lights 216 may be chosen based on whether the classroom is conducting testing.

At step 506, a lighting attribute is selected, via the web-based user interface, for each of the chosen status indicator lights 216. These attributes are capable of configuring a particular color and blink pattern and timing for each of the first light segment 302 and the second light segment 304 (see FIGS. 3 and 4).

At step 508, a user can configure, via the web-based interface, whether the attribute selected at step 506 is turned "on" or "off." For instance, in the above described class change example, at the onset of the classroom change period, the second step in the class change sequence is to turn on the first lighting pattern for the status indicator lights 216 (see FIG. 2). In this exemplary embodiment, the third step of the sequence is to turn off the lighting pattern, which would be accomplished by having the third order event set at step 502 be the same as the second order event but configure it as an "off" event at step 508.

In the above manner, lighting events performed by one or more status indicator lights 216 (see FIGS. 2, 3 and 4) can be added in an ordered number within any sequence of events performed by a school communication system 200.

The above description of status indicator lights is made with respect to certain embodiments of this disclosure used within a school environment. However, as previously discussed, other embodiments of the status indicator lights that are not limited to use within a school environment are contemplated. For instance, status indicator lights in accordance with the above description may be used in other environments, such as office buildings, clinics, or any facility with rooms or spaces and/or hallways where visual indication of room/zone status may be desirable. Accordingly, it is contemplated that any building, room within a building, or any space in general that may utilize visual indication of status is within the scope of the disclosure contained herein.

Figure 6A:
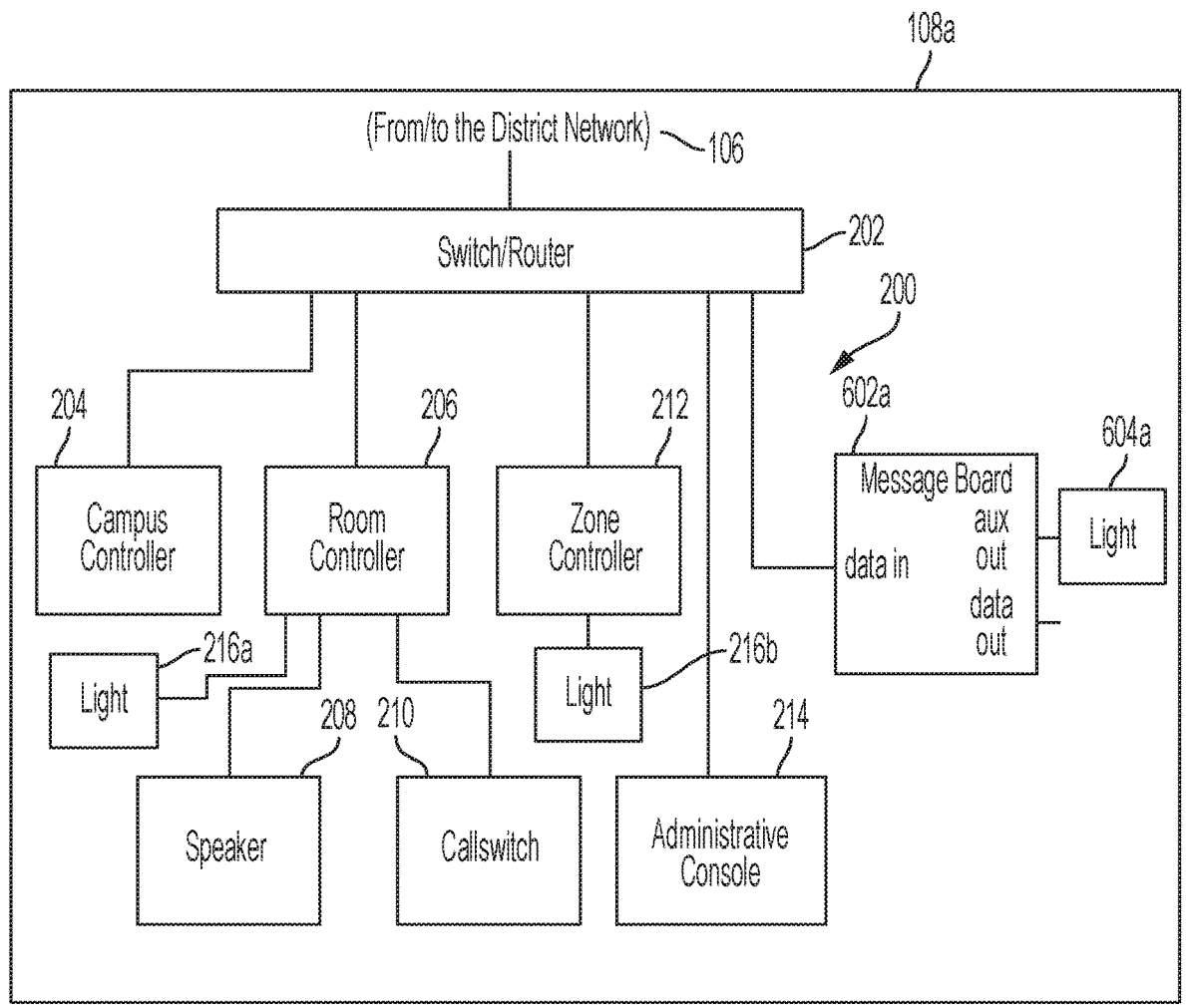
FIG. 6A is a block diagram of components of the communication system of FIG. 1, at the individual school level, according to an exemplary embodiment.

FIG. 6A illustrates the components of the school communication system 200 for individual school campus 108*a* (see FIG. 1; and individual school campuses 108*b* and 108*c* may include school communication systems similar to school communication system 200). The school communication system 200 is similar to that shown in FIG. 2 in that it includes a switch/router 202, which provides a shared network connection for the various components to the district network 106. The various components of the school communication system 200 are distributed throughout a plurality of zones and/or classrooms, each zone and/or classroom having certain communication equipment associated with the district location/school campus 108*a*.

Components of the school communication system 200 include the campus controller 204, the room controller 206, the zone controller 212, the administrative console 214, the status indicator lights 216*a*, 216*b*, and 604*a*, and a message board 602*a*. In the illustrated embodiment, only a single message board 602*a* and its associated status indicator light 604*a* are provided. However, in other embodiments, many message boards and associated status indicator lights, similar to message board 602*a* and status indicator light 604*a*, are contemplated. Indeed, in certain embodiments, each classroom and each zone within the campus 108*a* may include one or more message boards and/or associated status indicator lights. FIG. 6A only illustrates the single message board 602*a* and the single associated status indicator light 604*a* for ease of illustration.

In communication system 200, functionality of the campus controller 204, the room controller 206, the zone controller 212, the administrative console 214, and the status indicator lights 216*a* and 216*b* is similar to that previously described above in accordance with various embodiments of the disclosure. In addition, the message board 602*a* provides a visual notification in the form of a displayed message and can be configured via the district network 106 through the user computer system 110. The configurations are then uploaded to the campus controller 204 for execution at the message board 602*a*.

As such, in certain embodiments, the message board 602*a* is configured via the campus controller 204 to display various types of messages. For instance, in a particular embodiment, the message board 602a may be configured to display emergency instructions to enhance student and staff responses, or in another embodiment, the message board 602a may be configured to display various formats of the date and time. Additionally, the campus controller 204 can configure more than one message board (not illustrated) to display a message immediately or at a later scheduled time. The message board 602a can also provide static or scrolling messages. The message board 602a can display messages in multiple colors.

As illustrated, in certain embodiments, the message board 602a includes a message board interface. In certain embodiments, the message board interface may include a data-in input port, a power connection, a data-out output port and an auxiliary port. The data-in input port receives message board commands from the campus controller 204 that configure the message board 602a to display a particular message. The power connection provides power to operate the message board 602a. The data-out output port may be connected to further components of the communication system 200 such that data from the campus controller 204 may be passed to those components through this port. The auxiliary port may be connected to the status indicator light 604a, and data may be passed from the campus controller 204 through the message board 602a to the status indicator light 604a such that the status indicator light 604a may be operated in accordance with embodiments of the disclosure discussed above with respect to FIGS. 1-5.

In some embodiments, the message board interface of the message board 602a may include a Power over Ethernet (PoE) interface such that the data-in input port is an ethernet port that also powers the message board 602a. Accordingly, in these embodiments, the data-in input port both provides data to the message board 602a and the power connection to the message board 602a over the same connection. Alternatively, in certain embodiments, the message board interface may also include a Power over Ethernet plus (PoE+) connection.

Figure 6B:
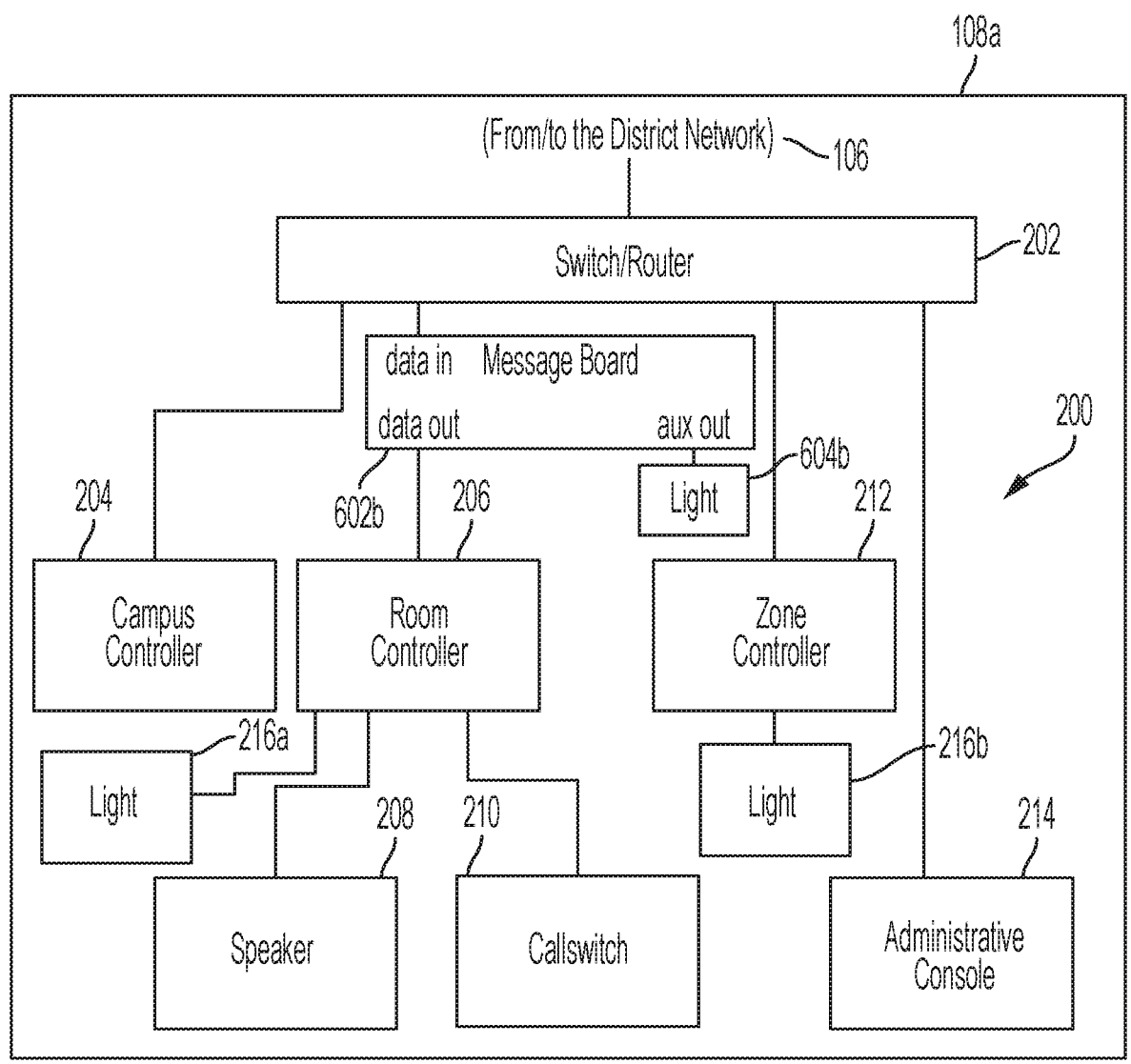
FIG. 6B is a block diagram of components of the communication system of FIG. 1, at the individual school level, according to an exemplary embodiment.

FIG. 6B illustrates the same school communication system 200, as in FIGS. 2 and 6A, but with message board 602b and its associated status indicator light 604b intermediate between the switch/router 202 and the classroom controller 206. In the illustrated embodiment, the message board 602b includes a message board interface similar to that of the message board 602a, as described above to include a data-in input port, a data-out output port, a power connection and an auxiliary port. However, in the illustrated configuration, the data-in input port is connected to the switch/router 202, the data-out output port is connected to the room controller 206, and the auxiliary port is connected to the status indicator light 604b.

In a particular embodiment, the message board interface of the message board 602a includes a pass through PoE network port for connecting other PoE devices. For example, the message board 602b can pass data and provide power to the room controller 206, the status indicator light 216a, the speaker 208 and the call switch 210 via a pass through PoE network port.

Figure 7:
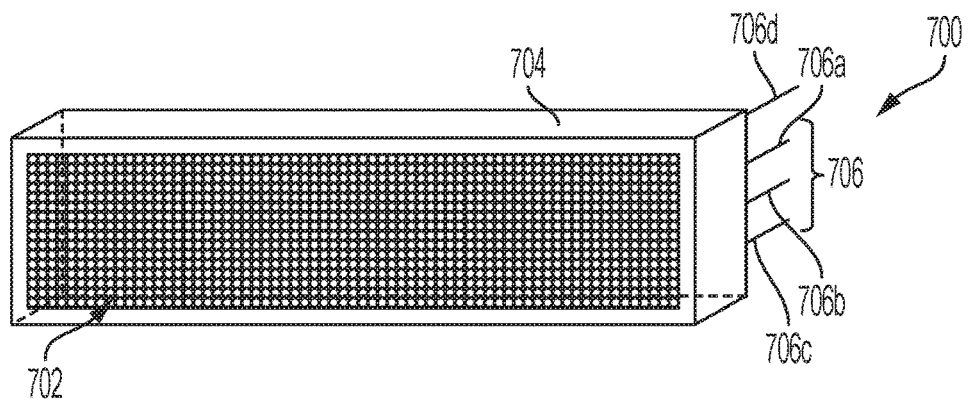
FIG. 7 is a perspective view of a message board, according to an exemplary embodiment.

FIG. 7 illustrates a perspective view of a message board 700 according to an embodiment of the disclosure. The message board 700 has a housing 704, a front face that includes a message display surface 702, and a message board interface 706. The message display surface 702 can include a tinted lens covering multiple lighting elements, such as a plurality of light emitting diodes (LEDs). The outer cover 704 can be a metal enclosure for protecting electronic components of the message board 700. In various embodiments, the message board 700 ranges in height from about 3.0-7.5 inches and ranges in width from about 12.0-26.0 inches.

In the illustrated embodiment, the message board interface 706 includes a plurality of ports. These ports include a data-in input port 706a, a power connection 706b, a data-out output port 706c, and an auxiliary port 706d. In certain embodiments, the data-in input port 706a, the power connection 706b, and the data-out output port 706c are collectively configured as a PoE or PoE+ pass through port that is able to both receive and pass data for downstream devices while also providing power to the message board 700 and other downstream devices.

Figure 8:
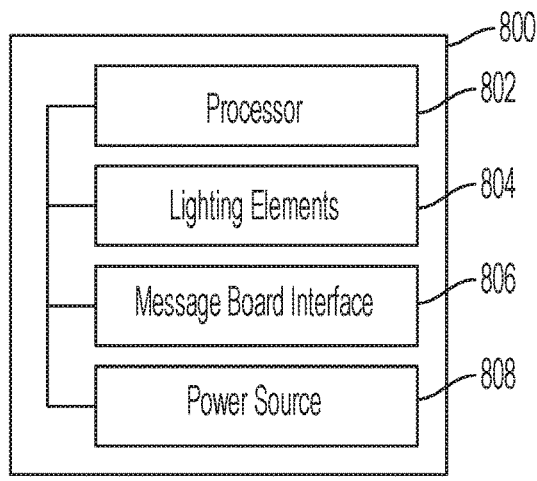
FIG. 8 is a block diagram of a message board, according to an exemplary embodiment.

FIG. 8 illustrates a block diagram of a message board 800 according to an embodiment of the disclosure. In the illustrated embodiment, the message board 800 includes a processor 802, one or more message lighting elements 804, a message board interface 806, and a power source 808. The processor 802 may include a message microcontroller and an associated non-transitory computer readable medium for interpreting signals received from the message board interface 806 in order to control the different message lighting elements 804 to display a message. The message microcontroller 802 can be an application specific integrated circuit (ASIC), a field programmable gate array (FPGA), or any other suitable processing circuit.

The message lighting elements 804 can include one or more lines of LEDs that light up in a certain pattern to display symbols or words contained in a message. The illuminated pattern of LEDs is determined by the message microcontroller 802 based on message board commands received from an outside network component such as the campus controller 204 (see FIGS. 6A and 6B).

The message board commands are received by the message board 800 at the network interface 806, which serves as both a power and data interface for the message board 800. In this capacity, the message board interface 806 includes a data-in input port, a data-out output port, a power connection, and, in certain embodiments, an auxiliary port. In a particular embodiment, the data-in input port is connected to the switch/router 202 (see FIGS. 6A and 6B), the data-out output port may be connected to downstream system components such as shown in FIG. 6B, the auxiliary port may be connected to a status indicator light 604a, 604b (see FIGS. 6A and 6B), and the power connection may be connected to an external or internal power source.

In an alternative embodiment, the power connection of the message board interface 806 can be provided in conjunction with the data-in input port in the form of one or more Ethernet ports that supports PoE and/or PoE+. In an embodiment, the network interface 806 supports IEEE 802.3af PoE and/or 802.3at PoE+ with network speed of 100 Mb/s and network connectors of RJ45 sockets. In some embodiments, the message board interface 806 can take a Category 5e or Category 6 cable 100 meters from any device nearest to it. For example, when the message board 800 is connected to a network switch, e.g., switch/router 202 (see FIGS. 6A and 6B), the cable connecting the message board 800 to the network switch may be 100 m in length. However, other length cable connections between a network switch and the message board 800 are contemplated.

In some embodiments, the message board 800 includes the power source 808 separate from the message board interface 806. The power source 808 can be a rechargeable or non-rechargeable battery, a regulator for regulating power from the power grid when the message board 800 is plugged into a wall outlet, or any other similar structure for providing system power.

Figure 9:
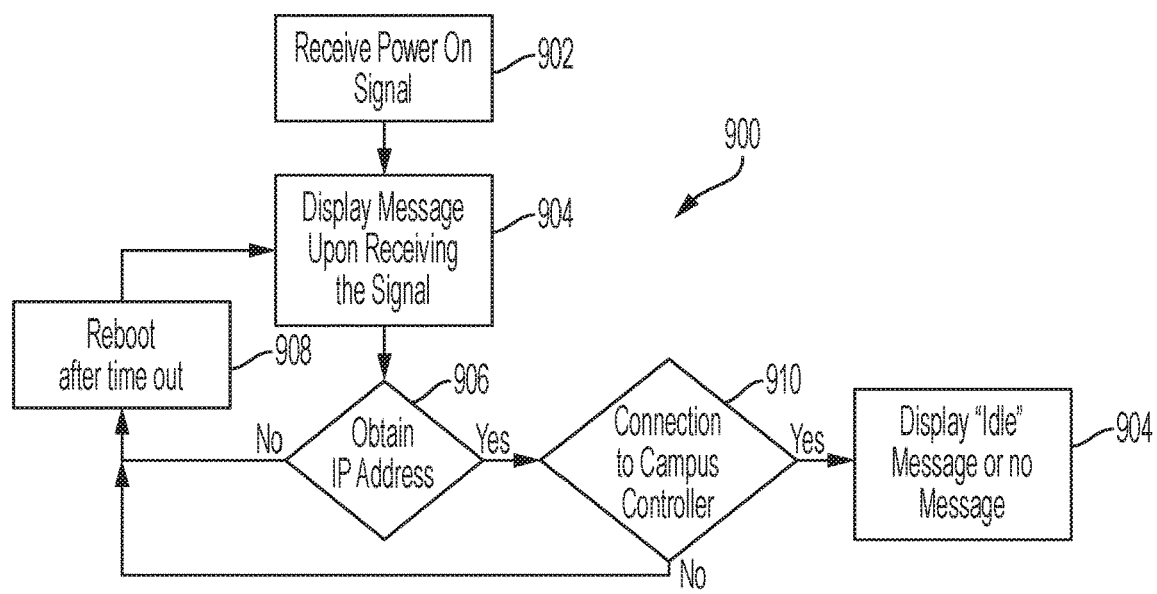
FIG. 9 is a boot up sequence flow chart for the message board of FIGS. 6A-8, according to an exemplary embodiment.

FIG. 9 illustrates a boot-up process flow chart 900 that shows steps taken by a message board during installation or a restart process within the school communication system 200 (see FIGS. 6A and 6B). At step 902, the message board receives a power on signal. In certain embodiments, this steps occurs upon connecting the message board to the school communication system 200 via the switch/router 202 over a PoE or PoE+ connection.

At step 904, the message board illuminates a pattern of its lighting elements to display a message, such as a preprogrammed message indicating that it is powered on and ready for set up. Shortly after indicating that it powered on, the message board attempts to obtain a network connection at step 906. For instance, in certain embodiments, obtaining a network connection may comprise the message board attempting to obtain an IP address. In the event that the message board is unsuccessful, it will display an offline message and reboot itself at step 908. After reboot, the process returns to step 904 to start the process over.

However, if the message board is successful in obtaining a network connection at step 906, then, at step 910, the message board attempts to establish a connection to the campus controller 204 (see FIGS. 6A and 6B). If the connection to the campus controller 204 is unsuccessful, then the process will reboot after a time out at step 908 and return to step 904. However, if the connection to the campus controller 204 is successful at step 910, then the message board will display a message reciting "idle" at step 912. Alternatively, the message board may display no message at step 912. Once the message board establishes a connection to the campus controller 204, then it is ready to be configured via the user interface accessed from the computer system 110 (see FIG. 1).

Figure 10:
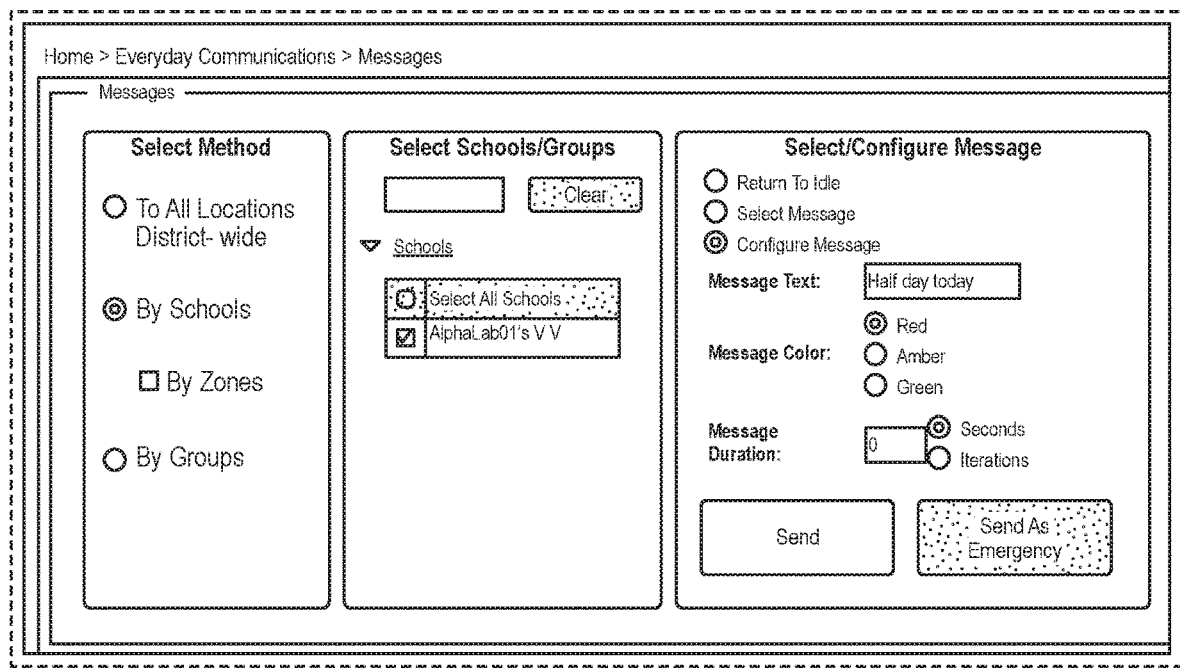
FIG. 10 is a user interface for configuring a message to display on the message board of FIGS. 6A-8, according to an exemplary embodiment.

FIG. 10 illustrates a screen shot of a configuration screen 1000 of the user interface accessed via the computer system 110 (see FIG. 1). The user interface of FIG. 10 provides three main sections used for configuring message boards. A "Select Method" section allows a user to decide how to select various message boards within the system for configuration. As illustrated, it provides selection of message boards based on various options. Those options are for selecting all locations district wide, specific schools within the district, and by groups of locations within the district. Depending on which selection is made, subsections may be displayed to further narrow the grouping of message boards within the various locations. For instance, in the illustrated section, the specific school selection is made, which then brings up a subsection for further narrowing the selection of message boards by further specifying various zones within the selected school.

The configuration functionality of the user interface further includes a "Select Schools/Groups" section of the configuration screen 1000. This section may change based on which selection is made within the subsections of the "Select Method" section of the configuration screen 1000. In the illustrated embodiment, a user is able to select various schools or groups of schools because the "By Schools" subsection is selected. In this manner, a user is able to select schools within the district.

The configuration screen 1000 further includes a "Select/Configure Message" section. In this section, particular messages can be configured or selected from pre-configured messages for display at the selected message boards. This section also allows a "return to idle" option that will instruct a message board to return to its idle state with no message displayed. In the illustrated embodiment, because the "Configure Message" option is selected, further subsections are provided related to specific text of the message, a color of the message and a duration or a number of iterations that the message should show at the selected message boards. In certain embodiments, iterations of a message means a number of times a message is displayed in a row, regardless of an amount of time to display the message. For example, displaying a message for 30 seconds might result in it displaying fully through three and a half times. But playing it four iterations guarantees seeing the message four times, regardless of how much time it takes to display a message for a complete message cycle.

Once configuration of the message is complete, the message can be sent in various manners in the form of a message board command. Accordingly, the computer system 110 collects the information about the message from the configuration screen 1000 and creates data instructing the message boards on how to configure the various lighting elements at the message board to display the image/message.

The message board command is also assigned a priority for display based on the type of message. The selected or configured message may be added as part of various types of communications within the selected environments, each with a defined system priority for displaying at the selected message boards in case of a conflict. For instance, the messages may be displayed as part of an everyday communication, a sequence, an emergency/fire alarm event, an all-clear event, an escalation event, or a scheduled event. When messages of a same priority conflict at the message boards, then those messages are queued at the message board for display. Any message event with a lower priority will be discarded if it conflicts with a higher priority message. Messages related to the emergency/fire alarm event have a highest priority such that they are always displayed over the other types of messages.

In certain embodiments, messages are assigned a system priority based on how the message was initiated within the system. For instance, a message will have an emergency level priority if the message is part of an emergency, and a lesser priority if the message is part of a schedule such as a class change. For instance, if the message is part of a class change, it will receive a bell schedule status priority or message priority, which is less than emergency priority. Another type of message is called an "On the fly" message, which is a message created for various types of contexts and can be assigned a priority at the time of creation. This priority is assigned based on the message type, such as emergency, standard message or a bell schedule message. Once a priority is assigned, the creator of the message can further specify whether that assigned priority can be changed in the future. As such, some priorities are fixed, which means they can only be changed by a system owner or administrator.

The above description of message boards is made with respect to certain embodiments of this disclosure used within a school environment. However, other embodiments of the message boards that are not limited to use within a school environment are contemplated. For instance, message boards in accordance with the above description may be used in other environments, such as office buildings, clinics, or any facility with rooms or spaces and/or hallways where visual indication of room/zone status may be desirable. Accordingly, it is contemplated that any building, room within a building, or any space in general that may utilize visual indication of status is within the scope of the disclosure contained herein.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A networked school communication system, comprising:
   a district server configured to manage at least one communication system located within a district location managed by the district server;
   a district network configured to communicatively couple the at least one communication system and the district server; and
   a user interface configured to allow access to the district server to control the at least one communication system,
   wherein the at least one communication system comprises:
      communication equipment of the district location, the communication equipment comprising a console, a speaker, a status indicator light, and a message board;
      a network switch configured to integrate the communication equipment associated with the district location into the at least one communication system; and
      a campus controller communicatively coupled to the network switch and configured to control the communication equipment associated with the district location, wherein the campus controller is configured to coordinate the communication equipment during an event at the district location;
   wherein the event comprises actions coordinated by the campus controller and performed by the communication equipment;
   wherein the actions comprise parallel actions and sequential actions, wherein the parallel actions are performed separate from other actions during the event, and sequential actions are performed based on a prior action performed during the event;
   wherein the message board comprises:
      a housing comprising a front face;
      a message board interface communicatively coupled to the network switch; and
      a plurality of lighting elements located at the front face of the housing and configurable by message board commands received over the message board interfaces;
   wherein the status indicator light comprises:
      a first light segment;
      a second light segment; and
      a digital interface configured for communication with the room controller of the communication system;
      wherein a state of the first light segment and a state of the second light segment are independently configurable based on the event; and
   wherein, during the event, the actions coordinated by the campus controller comprise:
      a first lighting action performed by at least one of the first light segment or the second light segment of the status indicator light, wherein the first lighting action comprises a light color and an on/off time pattern;
      announcing first audible information at the speaker, wherein the light color and the on/off time pattern are unique to the first audible information;
      displaying event information at the console; and
      displaying an event related message on the message board.

2. The networked school communication system of claim 1, wherein the message board interface comprises a data-input and a power connection, wherein the data-input is communicatively coupled to the network switch and the power connection powers the message board.

3. The networked school communication system of claim 2, wherein the message board further comprises a data-output configurable for communication with the classroom controller of the school communication schedule.

4. The networked school communication system of claim 3, wherein the message board interface is a Power over Ethernet (PoE) input connection and the data-output is a PoE output connection.

5. The networked school communication system of claim 1, wherein the message board commands configure the plurality of lighting elements to illuminate in order to provide the event related message, and wherein the message board commands comprise:
  data-instructing which lighting elements of the plurality of lighting elements to illuminate for the event related message; and
  a priority for the event related message so when multiple message board commands are received at the message board interface a highest priority message will be displayed.

6. The networked school communication system of claim 1, wherein the front face of the housing is approximately 3.75 inches in height and approximately 12.91 inches in width.

7. The networked school communication system of claim 1, wherein the front face of the housing is approximately 6.48 inches in height and approximately 24.84 inches in width.

8. A school communication system for at least one school campus with a plurality of classrooms, the system comprising:
  communication equipment of the at least one school campus, the communication equipment comprising a console, a speaker, a status indicator light, and a message board;
  a network switch configured to integrate the communication equipment of the at least one school campus; and
  a campus controller configured for controlling the communication equipment of the at least one school campus, wherein the campus controller is configured to coordinate the communication equipment during an event at the at least one school campus;
  wherein the event comprises actions coordinated by the campus controller and performed by the communication equipment;
  wherein the actions comprise parallel actions and sequential actions, wherein the parallel actions are performed separate from other actions during the event, and sequential actions are performed based on a prior action performed during the event;
  wherein the message board comprises:
    a housing comprising a front face;
    a message board interface communicatively coupled to the network switch;
    a plurality of lighting elements located at the front face of the housing and configurable by message board commands received over the message board interface; and
    an auxiliary output port configured to connect to a status indicator light of the school communication system;
  wherein the status indicator light comprises:
    a first light segment;
    a second light segment; and
    a digital interface configured for communication with the room controller of the communication system;
  wherein a state of the first light segment and a state of the second light segment are independently configurable based on the event; and
  wherein, during the event, the actions coordinated by the campus controller comprise:
    a first lighting action performed by at least one of the first light segment or the second light segment of the status indicator light, wherein the first lighting action comprises a light color and an on/off time pattern;
    announcing first audible information at the speaker, wherein the light color and the on/off time pattern are unique to the first audible information;
    displaying event information at the console; and
    displaying an event related message on the message board.

9. The school communication system of claim 8, wherein the message board interface comprises a data-input and a power connection, wherein the data-input is communicatively coupled to the network switch and the power connection powers the message board.

10. The school communication system of claim 9, wherein the message board further comprises a data-output configurable for communication with the classroom controller of the school communication schedule.

11. The school communication system of claim 10, wherein the message board interface is a Power over Ethernet (PoE) input connection and the data-output is a PoE output connection.

12. The school communication system of claim 8, wherein the message board commands configure the plurality of lighting elements to illuminate in order to provide the event related message, and
  wherein the message board commands comprise:
    data-instructing which lighting elements of the plurality of lighting elements to illuminate for the event related message; and
    a priority for the event related message so when multiple message board commands are received at the message board interface a highest priority message will be displayed.

13. The school communication system of claim 8, wherein the front face of the housing is approximately 3.0-7.5 inches in height and approximately 12.0-26.0 inches in width.

* * * * *